United States Patent [19]

Dodds et al.

[11] Patent Number: 4,700,877

[45] Date of Patent: Oct. 20, 1987

[54] BONDING MACHINE HAVING ROTATING FICTIONAL TOOLS AND WORK CLAMPING MEANS

[75] Inventors: Ralph G. Dodds, Crowthorne; Patrick B. Ryan, London, both of England

[73] Assignee: Luc Technologies Limited, London, England

[21] Appl. No.: 842,317

[22] Filed: Mar. 21, 1986

[30] Foreign Application Priority Data

Mar. 22, 1985 [GB] United Kingdom ................. 8507523

[51] Int. Cl.$^4$ ........................ B23K 20/12; B23K 37/04
[52] U.S. Cl. ..................................... 228/2; 228/44.7; 228/112; 228/179; 228/212; 29/741; 29/843; 29/860; 29/879; 29/760
[58] Field of Search .................... 228/2, 112, 114, 179, 228/44.7; 29/741, 843, 860, 879, 760

[56] References Cited

U.S. PATENT DOCUMENTS

| 3,434,861 | 3/1969 | Luc . | |
|---|---|---|---|
| 3,434,862 | 3/1969 | Luc . | |
| 3,589,591 | 6/1971 | Schwean | 29/843 |
| 3,750,926 | 8/1973 | Sakamoto | 228/179 |
| 3,777,221 | 12/1973 | Tatusko | 228/180.2 |
| 3,831,262 | 8/1974 | Luc | 29/470.1 |
| 3,899,377 | 8/1975 | Luc | 228/112 |
| 3,905,537 | 9/1975 | Schmehl | 228/180 |
| 3,941,292 | 3/1976 | Osipov | 228/179 |
| 3,949,896 | 4/1976 | Luc | 228/112 |
| 4,024,038 | 5/1977 | Luc . | |
| 4,106,167 | 8/1978 | Luc | 29/33 |
| 4,144,110 | 3/1979 | Luc | 228/2 |
| 4,220,845 | 9/1980 | Morreale | 228/180.2 |
| 4,355,199 | 10/1982 | Luc | 228/112 |
| 4,480,779 | 11/1984 | Luc | 228/112 |

FOREIGN PATENT DOCUMENTS 0102728 3/1984 European Pat. Off. ............ 228/114

Primary Examiner—Nicholas P. Godici
Assistant Examiner—Samuel M. Heinrich
Attorney, Agent, or Firm—Kenyon & Kenyon

[57] ABSTRACT

A machine for bonding connectors to the edge of a pcb by a Luc process has upper and lower wheels which are translated along the edge of the pcb for engaging the connectors to be applied respectively to the faces of the board. The relative position of the wheels at any given time is determined by mounting one of them to move with a jaw which closes down onto one of the faces.

4 Claims, 6 Drawing Figures

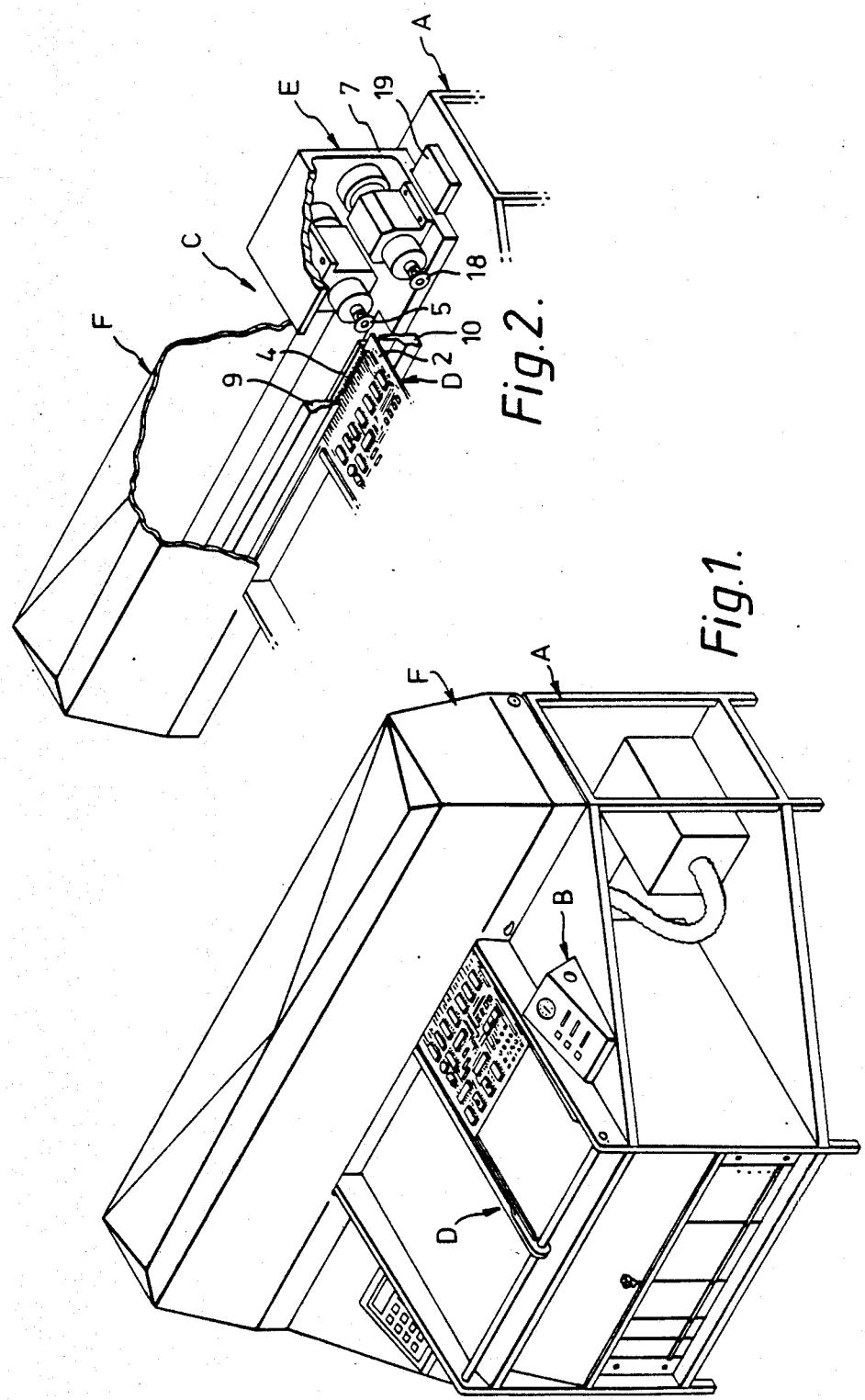

BONDING MACHINE HAVING ROTATING FICTIONAL TOOLS AND WORK CLAMPING MEANS

This invention relates to a machine which is particularly adapted to apply the type of bonding process now known as the Luc process with high precision in the delicate context of the securing of connectors or any other edge mounted item to a printed circuit board.

BACKGROUND OF THE INVENTION

Examples of disclosure of the Luc process in the electronic context are seen in co-pending applications [European No. 83.304258.3 filed Jul. 22, 1983] U.S. Pat. No. 516,910 filed Jul. 25, 1983 and U.S. Pat. No. 693,166 filed Jan. 22, 1985.

SUMMARY OF THE INVENTION

The machine according to the invention provides for the application of rotating frictional tools in a single transitional pass to a plurality of connector/pad positions on each of the upper and the lower surface of a printed circuit board. The relative setting of the two tools may automatically compensate for boards of different thickness, and may be adjustable for different pressures to be applied to components to be bonded; and furthermore the machine includes specially-adapted clamping means able to be brought down upon the elements to be bonded together in a controlled manner.

In the example to be described the machine is particularly concerned with forming a bond by reflow soldering between the various sorts of elements but it is applicable to welding or other forms of bonding by the Luc process.

The invention includes also a method of operating a bonding machine which includes causing two frictional tools to execute a pass over a plurality of connectors, one tool acting on connectors on an upper face of a printed circuit board and the other on connectors on the lower face of a printed circuit board, including adjusting the relative position of the tools so as to apply them precisely to the respective arrays of connectors.

BRIEF DESCRIPTION OF THE DRAWINGS

A particular embodiment of the invention will now be described by reference to the accompanying drawings wherein;

FIG. 1 is a perspective view of the machine with a protective cover over the working parts;

FIG. 2 is a scrap view with the cover cut away;

DESCRIPTION OF THE PREFERRED EMBODIMENT

Looking first at FIGS. 1 and 2 the machine has a stand A which at one side has a control console B and along on top edge a working zone C.

One or more printed circuit boards are mounted on carrier D to be worked on by a working head E which traverses along the edge of the board or boards. Normally, the working head will be covered by a protective cover F.

Figure 4:
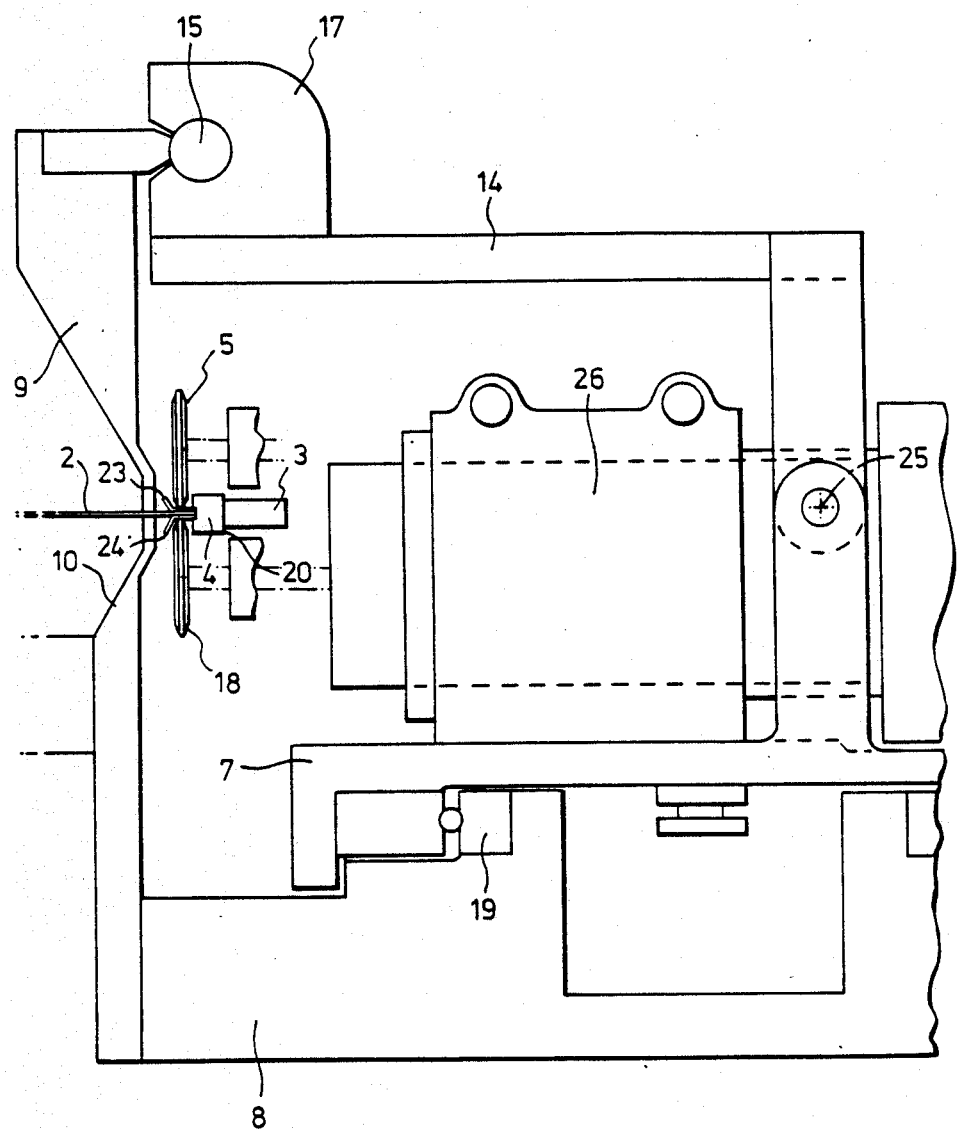
FIG. 4 is an end view.

Looking now in more detail, first at FIG. 4, the device D holds a printed circuit board 2 over the edge of which is arranged an edge connector 4, the feeding device pressing the board and connector against a backstop 3.

Figure 6:
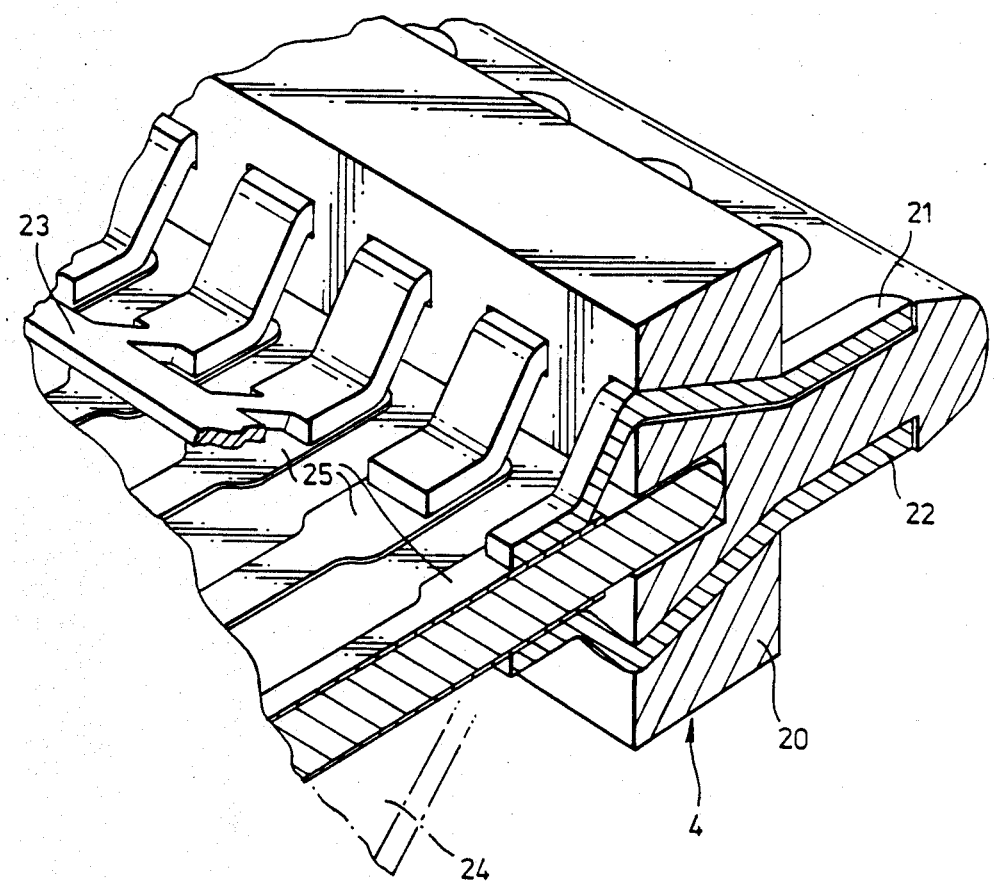
FIG. 6 is a diagrammatic view of an edge connector.

The edge connector 4 seen in more detail in FIG. 6 has a terminal block 20 from which protrude upper 21 and lower 22 connector arrays each consisting of separate strips of conductive material which for the purposes of strength during assembly are joined by flanges 23,24 respectively.

Each of the connector strips 21,22 is to be connected to a respective connection or pad 28 near the edge of the printed circuit board 2. The Luc process involved in this case is applied to cause electrical connection by reflow soldering, both the pads and the strips having previously been prepared for this.

The working head E includes two electric motors 26,27 (FIG. 5) which respectively mount directly on their shafts frictional wheels 18,5 (FIGS. 2 and 4).

The carriage 7 of the working head is mounted on a guideplate with bearings 19 so that it can execute passes along the edge of the printed circuit board and by engagement between the wheels 5 and 18 which are rotating at very high speed (giving a tangential speed hundreds or thousands of times higher than the translational speed of the pass) execute frictional action upon the arrays of connector strips 21,22 respectively, with or without the intervention of a non-bonding material between the tool and strips.

To hold the printed circuit board positively while this is happening, there are clamping jaws 9,10. The jaw 10 is fixedly mounted to a base plate 8 of the machine but the jaw 9 is moveable to allow for release of the printed circuit board. For this purpose it is pivotally mounted on arms 13 (FIG. 3) which are drawn down and released by one or more vertically mounted air cylinders 11 (FIG. 3).

An upper plate 14 of the carriage 7 is pivotally mounted to the rest of that carriage about pivot axis 25. A rail 15 is fixed to the top of the upper clamp jaw 9 and through a travelling block 17 the upper plate 14 is mounted through low-friction bearings to that rail (FIGS. 3 and 4). Thus when the bottom of the top clamping jaw 9 is in contact with the printed circuit board, the upper plate 14 of the travelling carriage will follow any variation, from position to position, of the upper jaw 9 due to any variation in thickness of the printed circuit board or any other reason.

The electric motor 27 mounting the upper of the two tools 5 is secured to that upper plate 14; thus the upper tool 5 will also in general follow any irregularity in the thickness of the printed circuit board.

Figure 3:
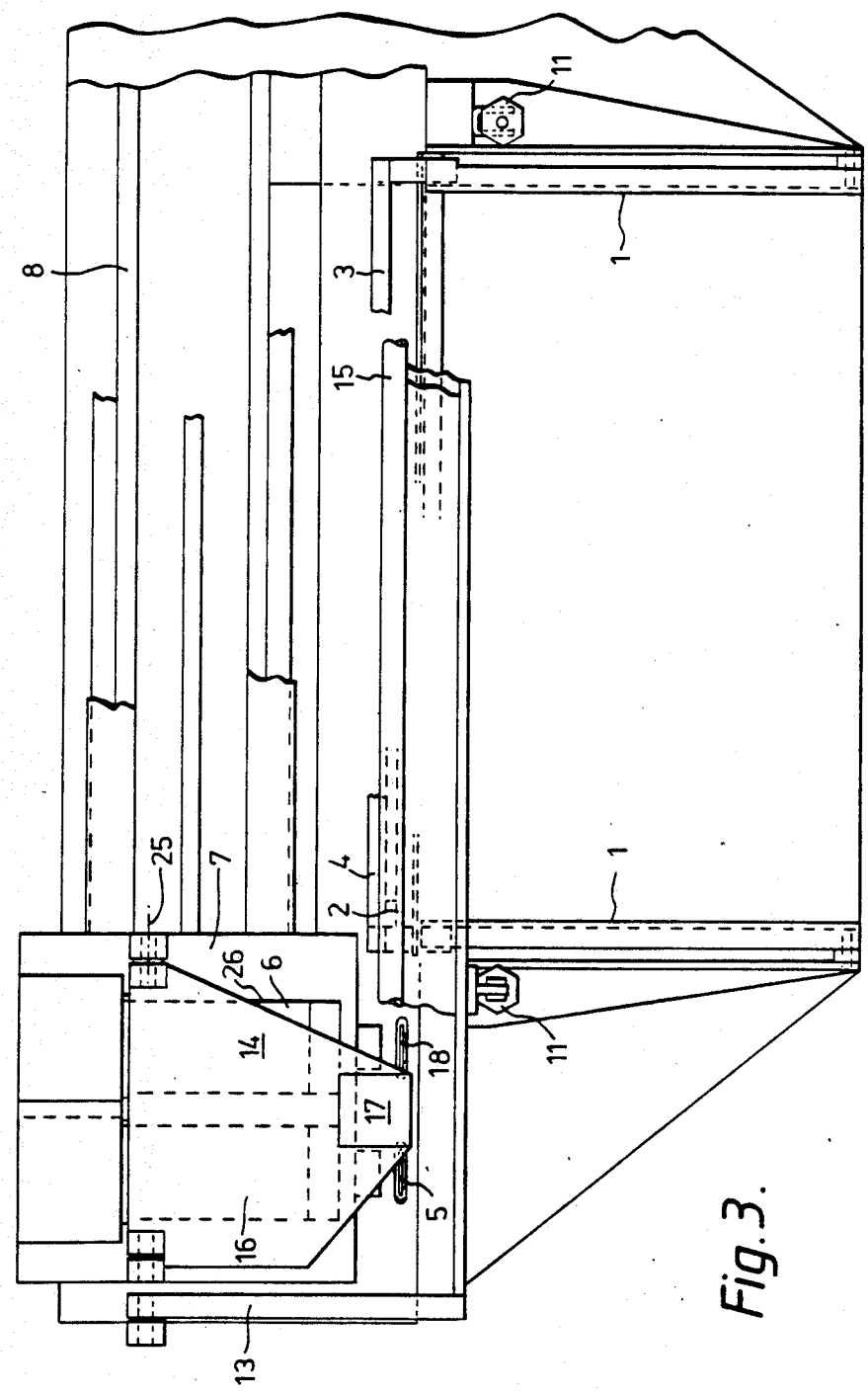
FIG. 3 is a general plan view of the working head of the machine.

The pivot axis 13a of the arms 13 is the same as the line of the axis 25 (FIG. 3).

However both on the upper and on the lower surface the thickness of the conductor strips 21,22 may alter as between different assemblies to be made and indeed they may be in any one assembly different on the upper as compared to the lower face.

Figure 5:
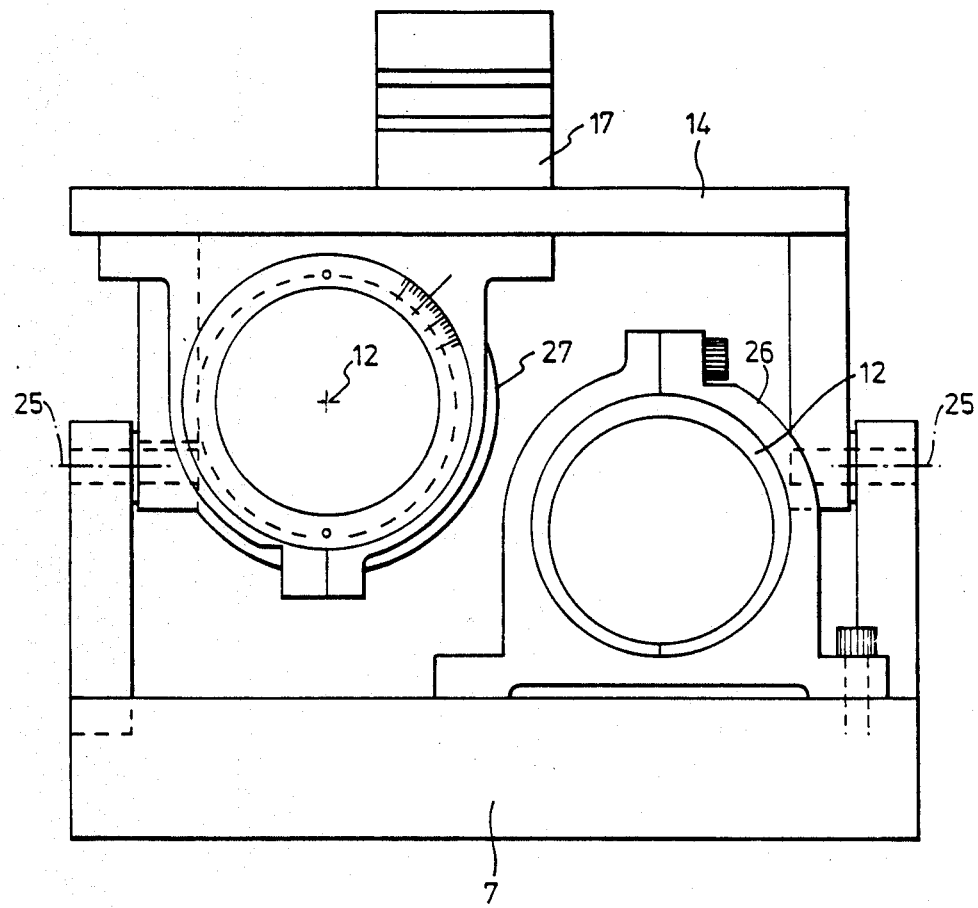
FIG. 5 is a back view of the working head.

To allow for this, each motor 26,27 is mounted on eccentric journals 12 as can best be seen in FIG. 5, so that the respective setting of the tools in relation to a known datum (the bottom of the upper clamping jaw 9 and the top of the lower clamping jaw 10 respectively) can be simply adjusted by rotation of the eccentric journals by a handscrew (not shown) for altering the eccentric journal.

In this embodiment the pivot line 25 and therefore the pivot axis of the arms 13 is generally aligned with the central major plane of the printed circuit board 2, so that there is no scrubbing action of the upper clamp jaw 9 as the upper plate is closed down before work is started (FIG. 3).

We claim:

1. A machine for forming bonds between connectors and each upper and lower face of an edge of a printed circuit board, the machine comprising:
   a frame,
   rotatable wheels for operating respectively at respective upper and lower faces of said printed circuit board,
   means for rotatably mounting the rotatable wheels,
   carriage means mounted on the frame and carrying the rotatably mounting means for moving said wheels in translation along the printed circuit board,
   drive means for rotating the rotatable wheels at high speed,
   means for holding the connectors adjacent to the upper and lower faces of the edge of the printed circuit board, the holding means including jaws for engaging the respective faces and means mounting at least one of the jaws for movement into and out of the engagement, and
   means for supporting the rotatably mounting means with respect to the carriage means and thereby the wheels in relation to the printed circuit board to apply a predetermined pressure by the wheels respectively onto the printed circuit board through said connectors, the means for supporting the rotatably mounting means for the wheel associated with the face engageable by the at least one jaw being slidingly coupled to the holding means for the at least one jaw so that a positioning of the at least one jaw with respect to the face entrains positioning of the wheel with respect to the face.

2. A machine as claimed in claim 1 wherein the holding means include means for pivotally mounting at least one of the jaws for movements into and out of the engagement about a pivot axis extending parallel to the direction of translation, the pivot axis being generally coplanar with the printed circuit board.

3. A machine as claimed in claim 1 wherein the rotatably mounting means for mounting at least one of the wheels comprises adjustment means for adjusting the positional relationship between the wheel and the jaw.

4. A machine as claimed in claim 3 wherein the adjustment means comprise an eccentric journalling of the one of the wheels.

* * * * *

UNITED STATES PATENT AND TRADEMARK OFFICE
CERTIFICATE OF CORRECTION

PATENT NO. : 4,700,877
DATED : October 20, 1987
INVENTOR(S) : DODDS, et al.

It is certified that error appears in the above-identified patent and that said Letters Patent is hereby corrected as shown below:

In the title, delete "FICTIONAL" and insert --FRICTIONAL--.

Column 1, line 63, delete "on" and insert --one--.

Signed and Sealed this

Tenth Day of May, 1988

*Attest:*

DONALD J. QUIGG

*Attesting Officer*      *Commissioner of Patents and Trademarks*